United States Patent Office 3,732,235
Patented May 8, 1973

3,732,235
SALT OF PYRIDOXINE ALPHA-KETOGLUTARATE WITH 5-HYDROXYTRYPTOPHANE
Cristobal Martinez, Miguel Fernandez, and Rodrigo Carmona, Madrid, Spain, assignors to Laboratorios Made, S.A., Madrid, Spain
No Drawing. Filed Feb. 23, 1971, Ser. No. 118,151
Claims priority, application Spain, Feb. 25, 1970, 376,906
Int. Cl. C07d 31/34, 31/28
U.S. Cl. 260—295 R                1 Claim

ABSTRACT OF THE DISCLOSURE

A compound of the formula:

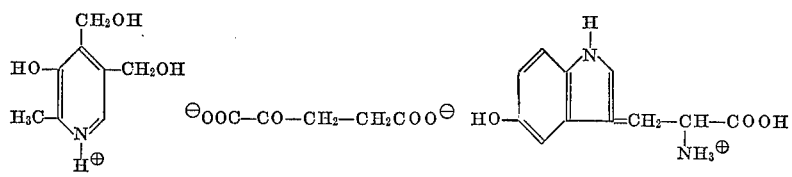

The compound is prepared by reacting pyridoxine alpha-ketoglutarate with 5-hydroxytryptophane. The compound is useful for treating deficiencies in neuronal metabolism, tremors, infant's convulsions, nervous troubles caused by administration of isoniazed, difficulties in neuromuscular activity, alcoholism, atherosclerosis, anaemias, cirrhosis, skin diseases, etc.

CROSS REFERENCE TO RELATED APPLICATION

This application relates to an improvement on the subject matter of U.S. Ser. No. 878,959, filed Nov. 21, 1969, now abandoned, and replaced by continuation application Ser. No. 218,614, filed Jan. 17, 1972.

The present invention refers to a method for preparing a compound formed by reacting pyridoxine alpha-ketoglutarate with 5-hydroxytryptophane. This new salt of 5-hydroxytryptophane has the great advantage of promoting the solubility of the 5-hydroxytryptophane and increasing its stability, very low in other types of solutions.

The general method of synthesizing this compound consists of dissolving the pyridoxine alpha-ketoglutarate described in application Ser. No. 878,959 in distilled water and stirring in the stoichiometric quantity of 5-hydroxytryptophane, then freeze-drying the resulting solution or precipitating the solid salt by means of a water-soluble organic solvent.

The compound has the formula:

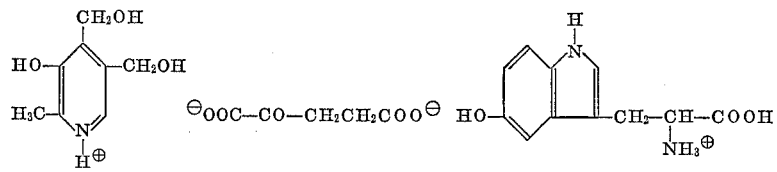

Example 315.28 gr. (1 mol) of pyridoxine alpha-ketoglutarate and 1,000 ml. of water are placed in a flask and dissolved by stirring with an electromagnetic stirrer; when the mixture is dissolved addition is begun, little by little as it dissolves, of 220.23 gr. (1 mol) of 5-hydroxytryptophane, after which addition the mixture is filtered over a plate to eliminate any possible solid in suspension and is subjected to freeze-drying at room temperature at a pressure of $2 \times 10^{-2}$ mm. of Hg.

The salt, in long white needles, formed with practically quantitative yield, is crystallized, and after being vacuum-dried over phosphorus pentoxide at room temperature is analyzed.

Calcd. for $C_{24}H_{29}N_3O_{11}$ (percent): C, 53.83; H, 5.41; N, 7.43. Found (percent): C, 53.88; H, 5.42; N, 7.53.

Infrared spectrum: Apart from the bands corresponding to the pyridoxine alpha-ketoglutarate appearing in the earlier-cited application, there are bands at 3,400 and 1,200 cm.$^{-1}$ (phenolic OH), although these partially overlap with those of the mother substance.

Nuclear magnetic resonance spectrum: Bands appear at $\tau=7.75$ (3 hydrogens corresponding to the pyridoxine methyl), 7.4 (4 hydrogens corresponding to the two alpha-ketoglutaric acid methylenes), 6.9 (2 hydrogens corresponding to the amino acid methylene), 6.2 (1 hydrogen corresponding to the amino acid methylene), 5.5 (4 hydrogens corresponding to the methylene hydrogens of the pyridoxine alcoholic groups), 3.4 (1 hydrogen corresponding to the H in alpha-pyrrole), 2.8–3.3 (3 aromatic hydrogens of the indole ring), and 2.2 (1 hydrogen corresponding to the alpha-pyridine) p.p.m.

Ultraviolet spectrum: Shows a maximum of 293 m$\mu$ (log $\epsilon=4.051$).

The product is a white solid crystallized in the form of needles which decomposes at 110° C., although it begins to soften much earlier. It is water-soluble and insoluble in nonpolar solvents.

The product obtained by this method is new and to our knowledge is not described in literature, and in the specific applications for which it is designed it has the advantages of increasing the stability of the 5-hydroxytryptophane and the water-solubility thereof.

Pyridoxine alpha-ketoglutarate is prepared by reacting pyridoxine with alpha-ketoglutaric acid or a functional derivative thereof, in an organic or inorganic solvent, the complete procedure is described in U.S. Ser. No. 878,959, filed Nov. 21, 1969.

The compound can be used for the same pharmacological purposes and in the same manner as pyridoxine alpha-ketoglutarate as described in U.S. Ser. No. 878,959, filed Nov. 21, 1969.

We claim:
1. A compound of the formula:
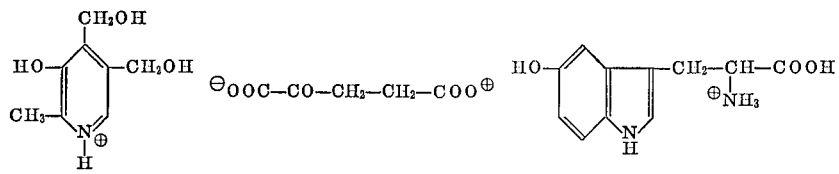
References Cited
UNITED STATES PATENTS
3,206,463  9/1965  Baetz ............. 260—297.5
3,627,774  12/1971  Sarbach et al. ...... 260—297.5
HENRY R. JILES, Primary Examiner
R. T. BOND, Assistant Examiner
U.S. Cl. X.R.
260—295 VB, 295 S, 295.5 V, 297.5; 424—263